United States Patent [19]
Antunez

[11] Patent Number: 4,794,946
[45] Date of Patent: Jan. 3, 1989

[54] INHERENTLY ADJUSTABLE INVERTED CUP FLOAT FOR A BALLCOCK VALVE

[76] Inventor: Bruce A. Antunez, 1143 Indian Springs, Glendora, Calif. 91740

[21] Appl. No.: 153,876

[22] Filed: Feb. 9, 1988

[51] Int. Cl.$^4$ .................... F16K 31/18; F16K 33/00
[52] U.S. Cl. .................. 137/426; 73/322.5; 137/432
[58] Field of Search .............. 137/426, 430, 432; 73/322.5

[56] References Cited

U.S. PATENT DOCUMENTS

| | | | |
|---|---|---|---|
| 2,809,656 | 10/1957 | Goldtrap | 137/432 |
| 3,194,070 | 7/1965 | Grant | 137/432 |
| 3,693,649 | 9/1972 | Gordon et al. | 137/432 |
| 4,431,024 | 2/1984 | Gallagher | 137/426 |

*Primary Examiner*—George L. Walton
*Attorney, Agent, or Firm*—Donald D. Mon

[57] ABSTRACT

An inverted cup float for a ballcock valve in a water tank. It is inherently able to select the water level in the tank by inherent selection of the point along its height where it becomes buoyant. An example is the provision of a plurality of vent ports at various heights along the cup which can selectively be opened to vent air from the cup at levels below the uppermost vent port.

1 Claim, 1 Drawing Sheet

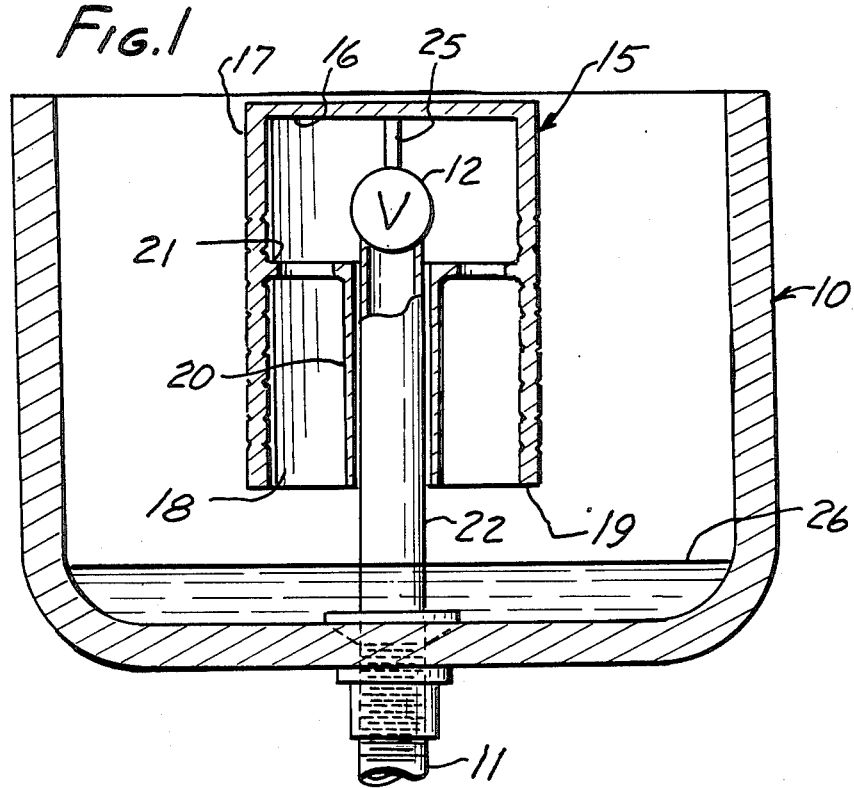
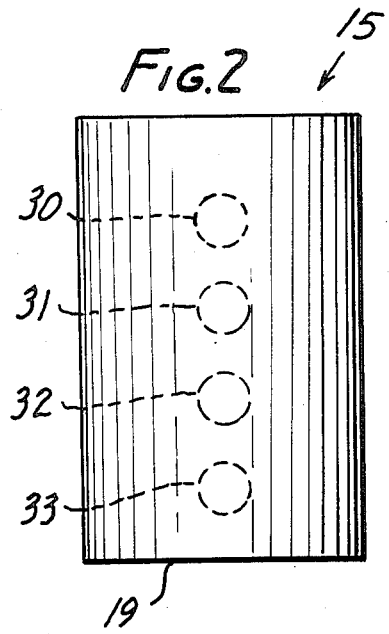
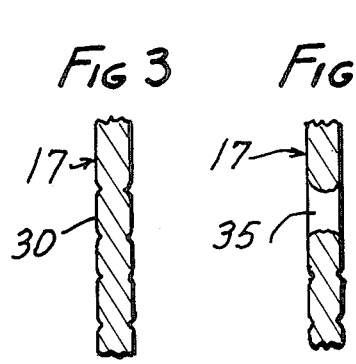
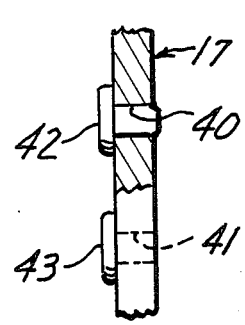
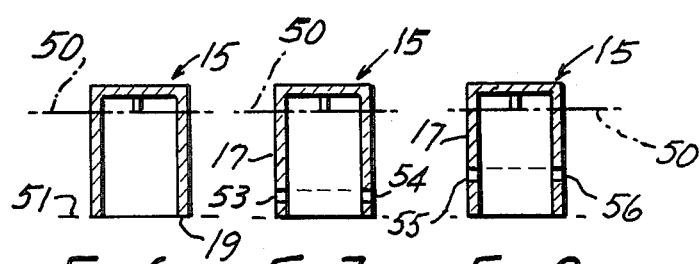

INHERENTLY ADJUSTABLE INVERTED CUP FLOAT FOR A BALLCOCK VALVE

FIELD OF THE INVENTION

An inverted cup float for a ballcock valve which is inherently adjustable to determine the water level at which it will become buoyant.

BACKGROUND OF THE INVENTION

Ballcock valves of the type commonly used in commode water tanks regularly utilize a float to establish the water level to which the tank is to be filled. The float enables the valve to open to refil the tank when the float is at some lower elevation, and causes the valve to shut off when the float rises to a predetermined elevation. This elevation is directly related to the desired water level.

The most commonly used float in the United States has the float pivotally mounted to the valve. This arrangement is widely used when the buoyant force of the float exerts a closing force on a valving element.

Another type of ballcock valve utilizes a differential pressure system, and the float merely opens or closes a pilot port. This arrangement enables a simpler and less expensive float system to be used, because it can be made without an intervening linkage between the float and the valve. In fact, it is commonly provided as an inverted cup, whose buoyancy is derived from air trapped in the cup by the rising water. The problem is in the adjustment of the cup relative to the valve so the water level can be adjusted. One way, of course, is to slidably mount the cup onto structure which itself moves relative to the valve. An example of workings useful with such a float is shown in Heyer et al U.S. Pat. No. 3,618,629.

The marketing of ballcock valves for toilet use is highly competitive, and anything which adds expense is a severe detriment to the manufacturer. It is an object of this invention to provide an inverted cup float which is inherently adjustable to determine the water level at which it becomes buoyant and shuts off the valve, without requiring any intervening structure, or sliding movement of the float for purposes of adjustment of the water level. As such its cost is minimized while it performs the same function relative to the valve as the known more complicated and expensive systems do.

BRIEF DESCRIPTION OF THE INVENTION

A float according to this invention comprises an inverted cup having an imperforate top wall, a peripheral side wall depending from said top wall, and an open mouth at its lower end. The peripheral side wall is generally imperforate, but is adapted to be pierced by vent ports at a plurality of vent levels, whereby to establish a vent level relative to the cup itself below which the cup will be vented, and above which air will be trapped so the cup will become buoyant when the water level outside the cup rises sufficiently above the uppermost open vent port.

According to a preferred but optional feature of this invention the peripheral wall is weakened at the said vent levels so a selected vent port can be opened by removal of a portion of the wall, for example a "knockout" portion.

According to another preferred but optional feature of the invention, the vent ports may be initially open through the wall and be selectively closed by plugs or covers.

The above and other features of this invention will be fully understood from the following detailed description and the accompanying drawings, in which:

BRIEF DESCRIPTION OF THE DRAWINGS

FIG. 1 is an axial cross-section, partly in schematic notation, showing the presently preferred embodiment of the invention;

FIG. 2 is a side view of the cup in FIG. 1;

FIGS. 3 and 4 are fragmentary cross-sections showing a portion of the side wall of the cup of FIG. 1 respectively unpierced and pierced;

FIG. 5 is a fragmentary cross-section showing another embodiment of the invention; and FIGS. 6, 7, and 8 are schematic cross-sections showing three different water levels at or near which the respective cups will become buoyant.

DETAILED DESCRIPTION OF THE INVENTION

A water tank 10 is shown having a water supply inlet pipe 11 rising to support a differential pressure ballcock valve 12 in the tank.

This valve is schematically shown, because its specific construction is unimportant to the invention. A valve such as shown in Heyer et al U.S. Pat. No. 3,618,629 is fully suitable. This patent is incorporated herein in its entirety for its showing of workings for a valve which will be opened when a float is lowered below a desired water level, and closed when the water level again rises to the desired water level. In the said Heyer valve, the opening an closing of the pilot port is accomplished by a pivoting float arm. In this invention, the inverted cup is substituted for the pivoted arm and separate float.

A flush valve (not shown) will be provided in the bottom of the tank. When it is opened to discharge the water from the tank into the commode, the float will lower and open the ballcock valve. When the flush valve closes after the tank is emptied, the ballcock valve will refill the tank, and will be shut off when the float becomes sufficiently buoyant as to the consequence of refilling the tank to lift away from the valve so it shuts off. This is a completely conventional operation.

As shown in FIG. 1, float 15 is an inverted cup. It has a closed top wall 16, a peripheral side wall 17, and an open bottom 18 with a lower edge 19. An optional stabilizer tube 20 is suppoted by a spider 21 in the inside of the float. Stabilizer tube 20 fits loosely around the sheath 22 of the ballcock valve so the cup can smoothly move up and down.

An actuator pin 25 can conveniently descend from the top wall to contact and open the valve when the float is in its lowermost position as shown in FIG. 1. It will rest on the valve in this position whenever the water level 26 in the tank is below that level where the float is made buoyant.

The feature which makes this float inherently adjustable is the provision of vent ports in the side wall at various levels along the vertical dimensions of the float.

FIG. 2 shows thinned sections 30, 31, 32, 33 at four levels along the cup. These are initially closed. The central section can readily be punched out. FIG. 3 shows section 30 in place and imperforate. FIG. 4 shows section 30 punched out to form a vent port 35. Any of the other thinned-sections could instead, or in some situations also, be punched out. Also, more than one set of these sections can be provided if desired.

FIG. 5 shows the side wall already perforated with ports 40, 41, and closed by removable plugs 42, 43 to leave selected port or ports open. Alternatively, these ports could be closed by covers, perhaps by patches or by encircling bands.

FIGS. 6, 7, and 8 explain the tank water level selection inherent in the float itself. Reference level 50 represents the level of contact of the actuator with the valve. If the actuator is lifted above that level, the valve will close.

In FIG. 6 there is no port through the side wall. When rising water in the tank covers the bottom edge, air in the cup will be trapped and water at level 51 will begin to exert a buoyant effect on the cup. After a sufficient rise that the weight of displaced water equals or exceeds the weight of the cup, the cup will rise and shut off the valve.

In FIG. 7 the side wall has been pierced by port 53 above the bottom edge. This port vents air from the cup until the water reaches level 54, at which point the cup traps air above the port, and the cup can start to be buoyant. This tank water level is higher than the level established by the bottom edge in FIG. 6.

In FIG. 8 port 55 pierces the side wall at a still higher height, and air will be vented until the tank water level reaches level 56. This is higher than the level in either FIG. 6 or FIG. 7.

It is evident that it is the uppermost open one of the vent ports which determines the water tank level when the valve shuts off. Lower ports can remain open if desired, but have no effect on the levels. This being the situation, the vent means is not necessarily limited to ports surrounded by wall structure, although they are the most convenient construction. Instead vertical slots which may or may not be cut through the bottom edge of the cup could instead be provided, and closure means such as bands or sliders could be provided to close the opening above the desired level. Such constructions are also defined as vent ports.

This invention thereby provides an expedient and inexpensive means inherently to select the intended water level in a tank.

This invention is not to be limited by the embodiments shown in the drawings and described in the description, which are given by way of example and not of limitation, but only in accordance with the scope of the appended claims.

I claim:

1. A float for a ballcock valve which is inherently adjustable to select a water level to be established in a tank, said float comprising:

an organic plastic molded inverted cup having a closed top wall and a peripheral sidewall, said sidewall being adapted to provide a vent port therethrough at a plurality of selective elevations along said sidewall, said sidewall has a plurality of different thicknesses, one of said thicknesses defining a plurality of weakened areas which can be easily and selectively pushed out to provide said vents for selecting a desired water level.

* * * * *